(12) United States Patent
Bodmann et al.

(10) Patent No.: US 10,261,486 B2
(45) Date of Patent: Apr. 16, 2019

(54) ON MACHINE INPUT/OUTPUT (I/O) SYSTEM WITH MODULAR CONNECTIONS

(71) Applicant: Rockwell Automation Technologies, Inc., Mayfield Heights, OH (US)

(72) Inventors: Douglas R. Bodmann, Shaker Heights, OH (US); Douglas A. Lostoski, Richfield, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 189 days.

(21) Appl. No.: 15/298,857

(22) Filed: Oct. 20, 2016

(65) Prior Publication Data
US 2018/0113428 A1 Apr. 26, 2018

(51) Int. Cl.
| | |
|---|---|
| G05B 15/00 | (2006.01) |
| G06F 13/14 | (2006.01) |
| G05B 19/042 | (2006.01) |
| G06F 13/38 | (2006.01) |
| G06F 13/40 | (2006.01) |
| G05B 19/04 | (2006.01) |

(52) U.S. Cl.
CPC ......... *G05B 19/0423* (2013.01); *G05B 19/04* (2013.01); *G06F 13/385* (2013.01); *G06F 13/4068* (2013.01); *G05B 2219/1105* (2013.01)

(58) Field of Classification Search
None
See application file for complete search history.

(56) References Cited

U.S. PATENT DOCUMENTS

| | | |
|---|---|---|
| 5,737,194 A | 4/1998 | Hopkins et al. |
| 7,412,548 B2 | 8/2008 | Sichner |
| 7,581,053 B2 | 8/2009 | Sichner et al. |
| 9,106,019 B2 * | 8/2015 | Kretschmann ....... H05K 7/1468 |
| 9,411,769 B2 | 8/2016 | Erni et al. |
| 2004/0171311 A1 | 9/2004 | Sichner et al. |
| 2013/0184840 A1 * | 7/2013 | Chin .................... H05K 7/1465 700/83 |

(Continued)

OTHER PUBLICATIONS

Extended European Search report dated Apr. 16, 2018 for European Application No. 17 191 509.3.

(Continued)

*Primary Examiner* — Hyun Nam
(74) *Attorney, Agent, or Firm* — Fay Sharpe LLP

(57) ABSTRACT

An industrial automation input/output module includes a housing, a power supply, and a network adapter. A plurality of I/O sockets are located in the housing, each comprising an socket contacts for power and data. A plurality of I/O segments are located in the housing, and each includes a segment housing that contains an I/O circuit for processing data associated with a controlled system and for communicating said data between to/from the network adapter. Each I/O segment further includes segment power/data contacts connected to the I/O circuit. Each I/O segment is received in one of the I/O sockets such that the segment contacts operably mate with the socket contacts for transmission of power and data and power between the socket contacts and the segment contacts. A plurality of field connectors are connected to the module housing and adapted for operably connecting with the associated controlled system.

11 Claims, 7 Drawing Sheets

(56) References Cited

U.S. PATENT DOCUMENTS

2015/0264157 A1* 9/2015 Liberman ............... H04L 67/42
                                                                709/203
2017/0176690 A1* 6/2017 Bretz ................... G02B 6/3817

OTHER PUBLICATIONS

Turck pamphlet titled *Stainless Steel Junction Box Connects up to Eight Signals in Harsh Process Environments*, Sep. 9, 2013.
Allen-Bradley document titled *Selection Guide ControlLogix System 1756 Series Catalog Numbers*, Publication 1756-SG001T-EN-P, Oct. 2015.
Deltav Whitepaper, pamphlet titled *Electronic Marshalling Overview*, Jan. 2013.

* cited by examiner

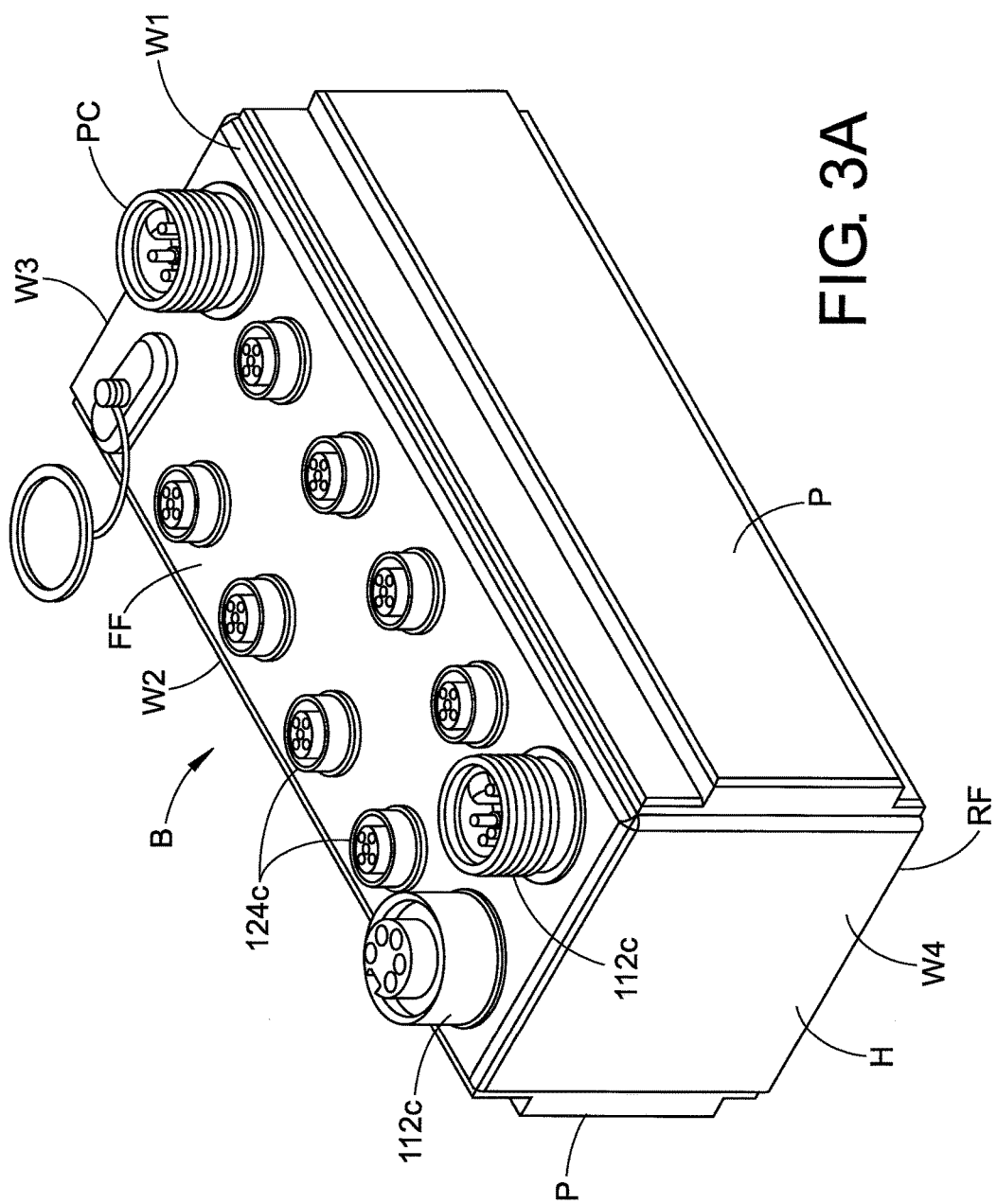

ON MACHINE INPUT/OUTPUT (I/O) SYSTEM WITH MODULAR CONNECTIONS

BACKGROUND INFORMATION

Industrial automation control systems comprise an industrial controller, which is a special purpose computer used for controlling industrial processes and manufacturing equipment on a real-time basis. Under the direction of a stored program, the industrial controller examines a set of inputs reflecting the status of the controlled or another machine or process and changes a set of outputs directed to the controlled machine or process. The inputs and outputs may be binary or analog.

Industrial controllers differ from conventional computers in that their hardware configurations vary significantly from application to application reflecting their wide range of uses. This variability is accommodated by constructing the industrial controller on a modular basis having removable input/output (I/O) modules that may accommodate different types and numbers of input and output points depending on the process being controlled. Also, the need to connect the I/O modules to different pieces of machinery that may be spatially separated from each other and located remotely from the controller has led to the development of distributed I/O systems that take a variety of forms. In one example, a self-contained discrete or "block" I/O module contained in a single housing is "distributed" and located remotely from the industrial controller so as to be located near the machine or process being controlled, e.g. directly mounted on or adjacent the machine or process being controlled. The block I/O module contains digital and/or analog input and/or output (I/O) circuits that provide input and/or output to the machine or process being controlled, a built-in power supply that receives electrical power and provides operative power for the I/O module itself and, optionally, any sensors or other field devices connected thereto, and a built-in network communications adapter for communicating with the industrial controller over a wired or wireless network. In another distributed I/O example, a single network adapter is connected to multiple self-contained I/O modules through a backplane circuit, in which case the number and type of I/O modules can be varied as needed, but the type and number of input and output points of each I/O module, itself, cannot be altered after the module is manufactured. FIG. 1 shows an example of an industrial automation control system S comprising an industrial controller 100 such as a programmable logic controller (PLC) or the like for controlling an industrial process or machine 126 (generally referred to as the controlled system 126). The controlled system 126 may comprise one or more field devices FD such as sensors, switches, safety devices, or the like connected thereto or otherwise associated therewith. A distributed block I/O module B' is located remotely from and connected to the industrial controller 100 through a wired or wireless network 116, which is typically a high-speed serial network implementing a suitable industrial automation network protocol such as ControlNet, DeviceNet, EtherNet/IP, RIO, ASi, PROFIBUS, PROFINET, Foundation Fieldbus or any other suitable industrial automation network protocol(s).

As noted above, the block I/O module B' is self-contained in a single housing H' and comprises a network adapter 112' providing a connection 114' to the network 116 via network connector(s) 112c'. The network adapter 112' communicates over the network 116 with the industrial controller 100 to receive output data from the industrial controller and to provide input data from the controlled system 126 to the industrial controller 100 for processing according to a stored control program.

The block I/O module B' also comprises one or more I/O circuits 120' that are permanently installed in the housing H' and that connect via field connections 124' (e.g., electrical cables, fiber optic cables, a wireless connection, etc.) with the field devices FD or other parts of the controlled system 126. In the case of hard-wired field connections 124', the cables thereof connect to the I/O circuit(s) 120' via I/O connectors 124c' which are typically M8, M12, or other industry standard field connectors. As is understood in the art, the I/O circuit(s) 120' convert digital data received from the controller 100 via network adapter 112' into output signals (either digital or analog) in a form suitable for input to the controlled system 126. The I/O circuit(s) 120' typically also receive digital or analog signals from the controlled system 126 and convert it to digital data suitable for transmission to the controller 100 through the network adapter 112'. In particular, each I/O circuit 120' comprises electronic circuitry such as A/D converters, D/A converters, multiplexers, buffers, counters, controllers, serializers, timers, I/O logic, memory, and/or like electronic devices such that the I/O circuit 120': (i) connects via field connections 124' with the controlled system 126; (ii) converts digital data received from the industrial controller 100 via network adapter 112' into analog or digital output signals for input to the field devices FD or other parts of the controlled system 126; and/or, (iii) receives digital or analog signals from the controlled system 126 or elsewhere and converts the received signals to digital data suitable for transmission to the industrial controller 100 via network adapter 112'. The block I/O module B' further comprises a power supply PS' that is connected through a power connector PC' to an external electrical power source PWR that supplies electrical voltage V to power the module B' and, optionally, to power sensors or other field devices FD connected to the module B' via field connections or cables 124'.

Block I/O modules B' as described above provide many advantages, but a primary disadvantage is that they cannot be easily customized or altered for a particular machine or process being controlled. In some cases, two or more different block I/O modules B' must be deployed, each having different configurations, but where neither module is used to its full capacity and each module includes unused I/O connection points. In other cases, modifications to the controlled system 126 will necessitate installation of a new block I/O module B', when it would be preferable to simply reconfigure the existing block I/O module B' with minimum disconnection of network connections 112c', power connections PC', and field connections 124c' to minimize machine down-time, labor costs, and the opportunity for wiring errors upon reconnection. Similar drawbacks exist for I/O modules other than block I/O modules, such as chassis-based I/O modules, and cabinet-based distributed I/O modules, and the like.

Also, as shown in FIG. 1A, with known block I/O modules B', the power connector PC', the network connector(s) 112c', and the I/O connectors 124c' are all located on the front face FF' of the module B' such that the connection axis CX' for mating these connectors with their respective cables C extends perpendicular to the mounting surface R on which the module B' is mounted with a rear face RF' of the module B' abutted with the mounting surface R. This leads to an undesirable situation in which the front face of the module is very crowded with connectors and cables, which limits space for indicator lights or other indicia and can complicate wiring or re-wiring operations in the field and lead to errors. Known arrangements also undesirably increase the amount of open space required adjacent the front face FF of the module to accommodate the multiple cables C and to provide each cable C with sufficient space to include a desired bend radius as required to prevent damage to the wires.

SUMMARY

In light of the above and other drawbacks associated with known block I/O systems, it has been deemed desirable to provide a block I/O module for mounting on or near a machine or process being controlled, wherein the I/O module is configurable and customizable for a particular application, and that can be reconfigured in the field.

In accordance with one aspect of the present development, an industrial automation input/output module includes a module housing, a power supply contained in the module housing and adapted to connect with an associated electrical power source, and a network adapter contained within the module housing and adapted to connect with an associated industrial automation data network. A plurality of I/O sockets are located in the module housing, each of the I/O sockets comprising an electrical socket contacts for power and data. A plurality of I/O segments are located in the module housing, and each of the I/O segments includes an I/O segment housing that contains an I/O circuit for processing data associated with an associated controlled system and for communicating said data between the associated controlled system and the network adapter. Each of the I/O segments further includes electrical segment power and data contacts operably connected to the I/O circuit. Each of the I/O segments is received and releasably retained in a respective one of the I/O sockets such that the segment contacts of each I/O segment are operably mated with the socket contacts of the I/O socket in which the I/O segment is respectively received and retained for transmission of power and data and power between the socket contacts and the segment contacts. A plurality of field connectors are connected to the module housing and each is adapted for operably connecting with the associated controlled system, wherein each of the I/O segments is operably connected to one of the field connectors.

In accordance with another aspect of the present development, an industrial automation control system includes an industrial automation controller and at least one input/output (I/O) module operatively connected to the industrial automation controller through an industrial data network for controlling an associated controlled system. The I/O module includes a module housing, a power supply contained in the module housing and adapted to connect with an associated electrical power source, and a network adapter contained within the module housing and adapted to connect with the associated industrial automation data network. A plurality of I/O sockets are located in the module housing, each of the I/O sockets comprising an electrical socket contacts for power and data. A plurality of I/O segments are located in the module housing, and each of the I/O segments includes an I/O segment housing that contains an I/O circuit for processing data associated with an associated controlled system and for communicating said data between the associated controlled system and the network adapter. Each of the I/O segments further includes electrical segment power and data contacts operably connected to the I/O circuit. Each of the I/O segments is received and releasably retained in a respective one of the I/O sockets such that the segment contacts of each I/O segment are operably mated with the socket contacts of the I/O socket in which the I/O segment is respectively received and retained for transmission of power and data and power between the socket contacts and the segment contacts. A plurality of field connectors are connected to the module housing and each is adapted for operably connecting with the associated controlled system, wherein each of the I/O segments is operably connected to one of the field connectors.

BRIEF DESCRIPTION OF THE DRAWINGS

The development comprises components and arrangements of components, and/or various steps and arrangements of steps, preferred embodiments of which are disclosed herein and shown in the drawings that form a part hereof, wherein:

FIG. 3A is an isometric view of an on machine block I/O device with modular connections formed in accordance with a first embodiment of the present development;

DETAILED DESCRIPTION

Figure 1:
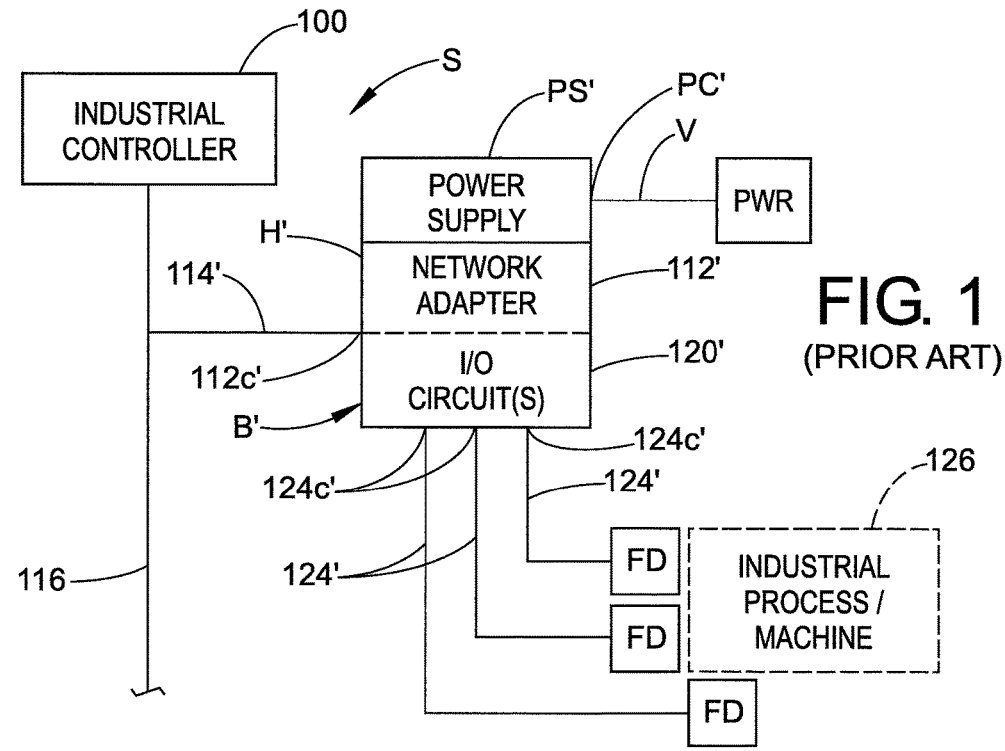
FIG. 1 shows a known industrial automation system comprising a known distributed block I/O module.
Figure 2:
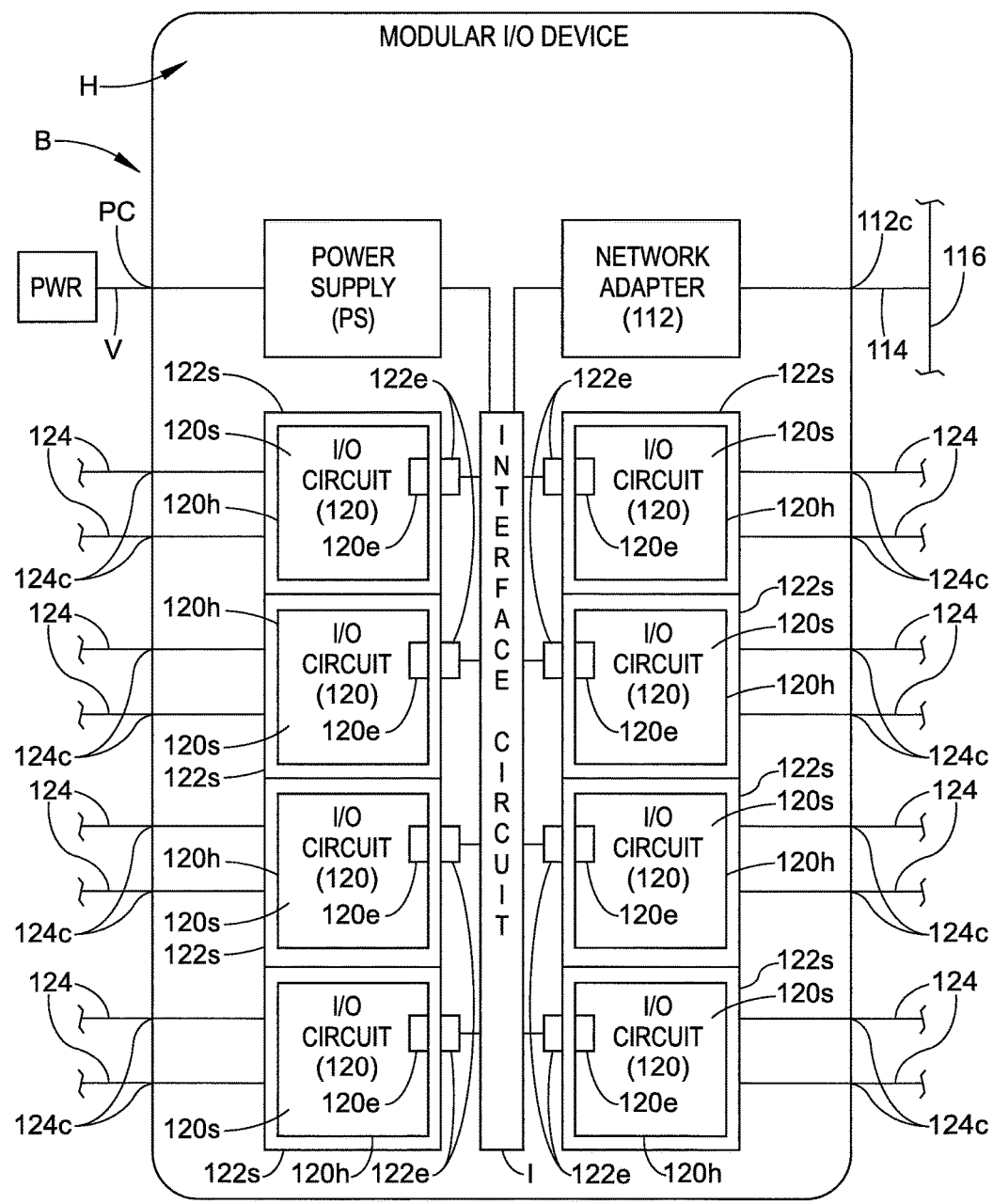
FIG. 2 shows a distributed block I/O device with modular connections formed in accordance with the present development.

FIG. 2 shows an on machine block input/output (I/O) device or module B with modular connections in accordance with the present development. The module B is self-contained in a single housing H and is adapted to be used as a distributed block I/O module in place of the distributed block I/O module B' in the industrial automation control system S of FIG. 1 or another industrial automation control system including an industrial controller 100 such as a programmable logic controller (PLC) or another type of industrial automation controller for controlling an associated industrial process or machine 126 comprising one or more field devices FD such as sensors, switches, safety devices, or the like connected thereto or otherwise associated therewith.

The distributed block I/O module B comprises a network adapter 112 providing a connection 114 to the network 116 via network connector(s) 112c. Each network connector 112c is affixed to the housing H. As described above, the wired or wireless network 116 implements a suitable industrial automation network protocol such as ControlNet, DeviceNet, EtherNet/IP, RIO, ASi, PROFIBUS, PROFINET, Foundation Fieldbus or any other suitable industrial automation network protocol(s). The network adapter 112 communicates over the network 116 with the industrial controller 100 (FIG. 1) to receive output data intended for the controlled system 126 from the industrial controller 100 and to provide input data from the controlled system 126 to the industrial controller 100 for processing according to a stored control program.

The block I/O module B further comprises a plurality of I/O circuits 120 that connect via field connections 124 (e.g., electrical cables, fiber optic cables, a wireless connection, etc.) with the field devices FD or other parts of the controlled system 126. In the case of wired field connections 124, the cables 124 connect to the I/O circuit(s) 120 via I/O connectors 124c which are typically M8, M12 or other connectors. The I/O circuit(s) 120 convert digital data received from the controller 100 via network adapter 112 into output signals (either digital or analog) in a form suitable for input to the controlled system 126. The I/O circuit(s) 120 typically also receive digital or analog signals from the controlled system 126 and convert it to digital data suitable for transmission to the controller 100 through the network adapter 112. In particular, each I/O circuit 120 comprises electronic circuitry such as A/D converters, D/A converters, multiplexers, buffers, counters, controllers, serializers, timers, I/O logic, memory, and/or like electronic devices such that the I/O circuit 120: (i) connects via field connections 124 with the controlled system 126; (ii) converts digital data received from the industrial controller 100 via network adapter 112 into analog or digital output signals for input to the field devices FD or other parts of the controlled system 126; and/or, (iii) receives digital or analog signals from the controlled system 126 or elsewhere and converts the received signals to digital data suitable for transmission to the industrial controller 100 via network adapter 112.

The block I/O module B further comprises a power supply PS that is connected to an external electrical power source PWR that supplies electrical voltage V to power the module B through a power connector PC and, optionally, to power sensors or other field devices FD connected to the module B via field connections 124. The power connector PC is affixed to the housing H.

Unlike the known block I/O module B', the block I/O module B of FIG. 2 includes modular connections for the I/O circuits 120. More particularly, the block I/O module B comprises an interface circuit I that is operatively connected to the power supply PS and to the network adapter 112, and that is selectively operatively connected with each of the I/O circuits 120 for communication of electrical power and data between interface circuit I and each I/O circuit 120. The interface circuit I includes all necessary electrical devices for communicating electrical power from the power supply PS to the network adapter 112 and to the I/O circuits 120, and for communicating I/O data between the network adapter 112 and the I/O circuits 120 such that the industrial controller 100 can communicate with the interface circuit I and the I/O circuits 120 connected thereto.

To provide the desired modularity, each I/O circuit 120 comprises or is defined by a self-contained I/O element or segment 120s enclosed within its own polymeric or other segment housing 120h. Each self-contained I/O segment 120s includes all required electronic circuitry and devices to perform its particular I/O function, i.e., all I/O circuitry required to interface with and provide input and output of data to/from a particular field device FD or other part of the controlled system 126. For example, each I/O segment 120s can be a digital or analog input module, a digital or analog output module, an input or output safety module, or any other particular I/O circuit that is self-contained in a segment housing 120h. Each I/O segment 120s also comprises electrical interface segment contacts 120e for operative communication of electrical power and data between the interface circuit I and the I/O segment 120s. Each I/O segment 120s, itself, can comprise one or more than one I/O circuit 120. Also, "blank" or non-functional I/O segments 120s can be provided in which the I/O circuit 120 is omitted but that can be selectively installed in an empty socket 122s to fill the socket 122s and protect the socket contacts 122e.

The block I/O module B further comprises a plurality of I/O segment receiving locations such as recesses or sockets 122s, each of which comprises a space defined in the housing H that is adapted to selectively mechanically receive and retain one of the I/O segments 120s (segment housings 120h) in an operative or installed position relative to the I/O module housing H. Each of the I/O sockets 122s further comprises electrical socket contacts 122e operably electrically connected with the interface circuit I for communication of electrical power and data therewith. The socket contacts 122e abut or otherwise mate with the one or more corresponding segment contacts 120e when the relevant I/O segment 120s is operatively installed in the respectively I/O socket 122s to allow data and electrical power to be communicated between the I/O segment 120s and the interface circuit I. When the I/O segment 120s is removed or uninstalled relative to an I/O socket 120s, the electrical contacts 120e, 122e of the I/O segment 120s and socket 122s are decoupled from each other.

In one embodiment, the I/O connectors 124c for connecting with the field connections 124 are provided as an integral part of each removable I/O segment 120s by being operably affixed to the I/O segment housing 120h. In an alternative embodiment, as shown herein, the I/O connectors 124c are instead affixed to the module housing H adjacent to each socket 122s or elsewhere and are selectively electrically operably mated with the I/O circuit 120 of an I/O segment 120s when the I/O segment 120s is operably installed in a socket 122s of the module housing H. In one example, the I/O connectors 124c are each operably electrically connected to the electrical contacts 122e of one of the I/O sockets 122s, through the interface circuit I or otherwise such that when an I/O segment 120s is installed in a socket 122s, the I/O circuit 120 of the installed I/O segment 120s is operably electrically connected to the I/O field connector 124c for input and output of data and/or power over the field connections 124. Alternatively, each I/O segment 120s directly electrically mates with one of the I/O field connectors 124c when the I/O segment 120s is installed in an I/O socket 122s.

Figure 1A:
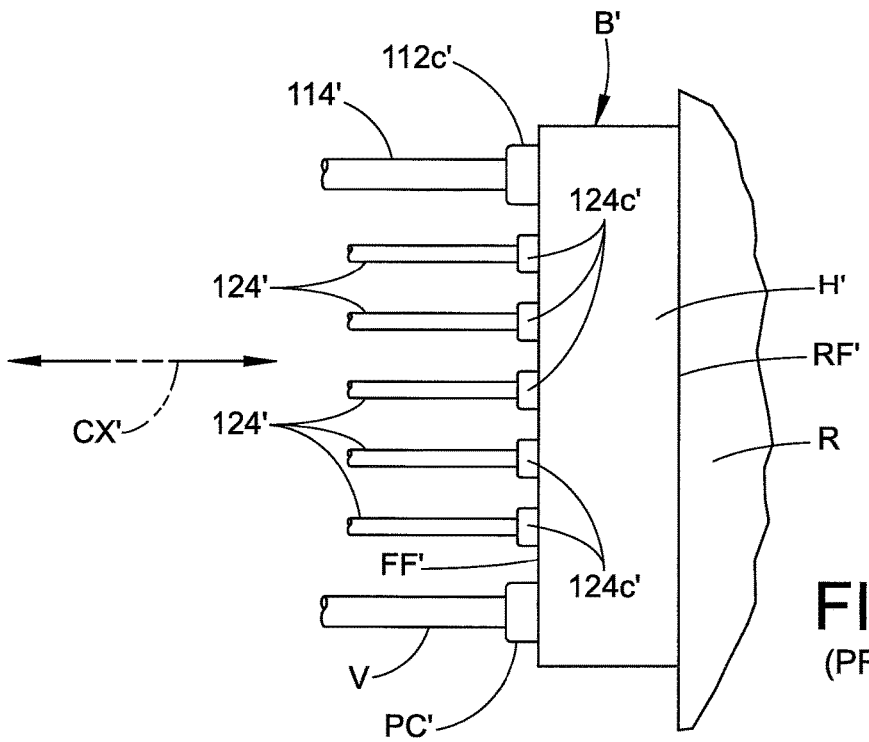
FIG. 1A illustrates the known block I/O module of FIG. 1 and the connection of cables thereto.
Figure 3B:
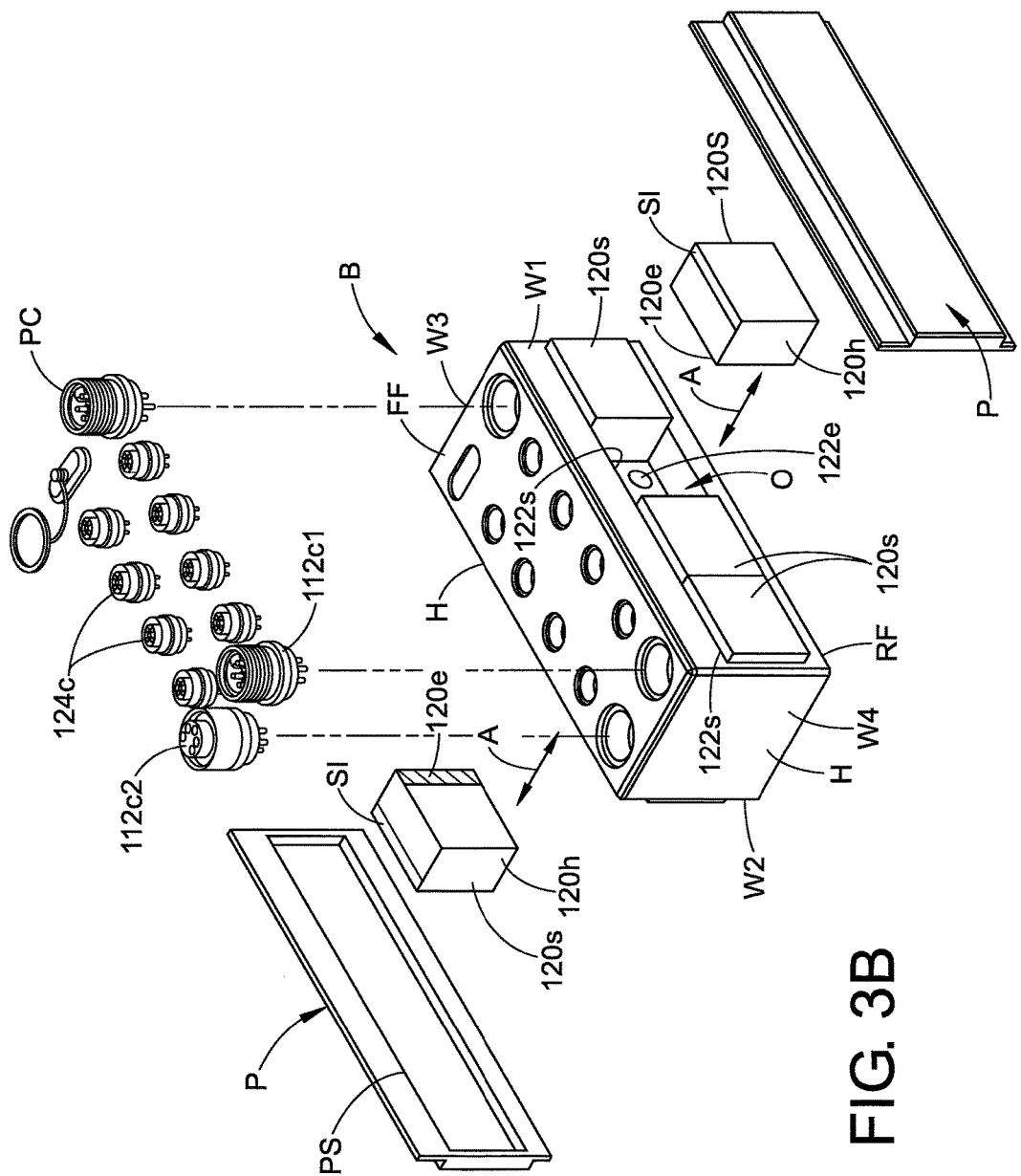
FIG. 3B is an exploded isometric view of the block I/O device of FIG. 3A.

FIG. 3A is an isometric view of an on machine block I/O device B with modular connections formed in accordance with a first embodiment of the present development and including all of the features described with reference to FIG. 2. FIG. 3B is an exploded isometric view of the block I/O device B of FIG. 3A. The block I/O device B is self-contained in a single enclosure or housing H that comprises a front face FF, left (first) and right (second) side walls W1,W2, top (third) and bottom (fourth) sidewalls or walls W3,W4, and a rear face RF. The module B is adapted to be mounted to a machine or other associated support surface R as shown for the module B' in FIG. 1A, with its rear face RF abutted with the associated support surface R, but the housing of the module B can alternatively be structured for mounting in any other suitable location such as on a DIN rail, in a cabinet, or be otherwise operably mounted in any known manner.

The I/O module B comprises one or more network connectors 112c that provide the connection 114 from the network adapter 112 to the network 116. In the illustrated embodiment, the module B comprises an input network connector 112c1 and an output network connector 112c2, each affixed to the housing H and operably connected to the network adapter 112. The block I/O module B further comprises a power connector PC affixed to the housing H and connected to the power supply PS. In the present embodiment, the network connectors 112c and the power connector PC are connected to and project outwardly from the front face FF of the module.

The block I/O module B further comprises a plurality of I/O field connectors 124c that are connected to and project outwardly from the front face FF for connection of the field cables 124 thereto. As described above, these I/O field connectors 124c are operably electrically connected to the respective I/O segments 120s when the I/O segments are operable installed in the respective I/O sockets 122s.

In the embodiment of FIGS. 3A and 3B, the housing H comprises at least one and preferably first and second sidewall panels P that are selectively connected to and removable from the respective housing sidewalls W1,W2 or another part of the housing H. More particularly, each sidewall W1,W2 defines an opening O that is selectively covered by the respective panel P when the panel is connected to the remainder of the housing H such that the panels P become part of the housing H when connected thereto. An elastomeric seal PS is preferably installed at the interface between each panel P and sidewall W1,W2 to provide an environmental seal to inhibit ingress of water, oil, dirt and other contaminants into the opening O, the I/O sockets 122s, or other parts of the housing H. When the panels P are separated from the remainder of the module housing H as shown in FIG. 3B, the I/O sockets 122s of the housing are exposed and open for insertion and/or removal of the I/O segments 120s through the opening O as indicated by the double arrows A. Depending upon the environment, the panels P can optionally be omitted from the housing, e.g. if the block I/O module B is mounted in a cabinet or other protective enclosure.

FIG. 3B also shows that each self-contained I/O element or segment 120s enclosed within its own polymeric or other housing 120h. As noted above, each self-contained I/O element or segment 120s includes all required electronic circuitry and devices to perform its particular I/O function, i.e., all I/O circuitry required to interface with and provide input and output of data to/from a particular field device FD or other part of the controlled system 126. The I/O segments 120s are retained in their respective sockets 122s by a latch, friction fit, and/or are each captured in a socket 122s by the panel P when the panel is affixed to the housing H. In one example, the segment contacts 120e and socket contacts 122e are mated in a mechanical male/female plug arrangement to retain each segment 120s in its socket 122s. Each I/O segment includes color, text, symbols, LED indicator lights, or other I/O segment indicia SI to indicate its function and operation or operational state. If desired, the I/O sockets 122s and I/O segments 120s can be mechanically keyed such that only I/O segments 120s of a particular type or function can be inserted into particular I/O sockets 122s.

Figure 4A:
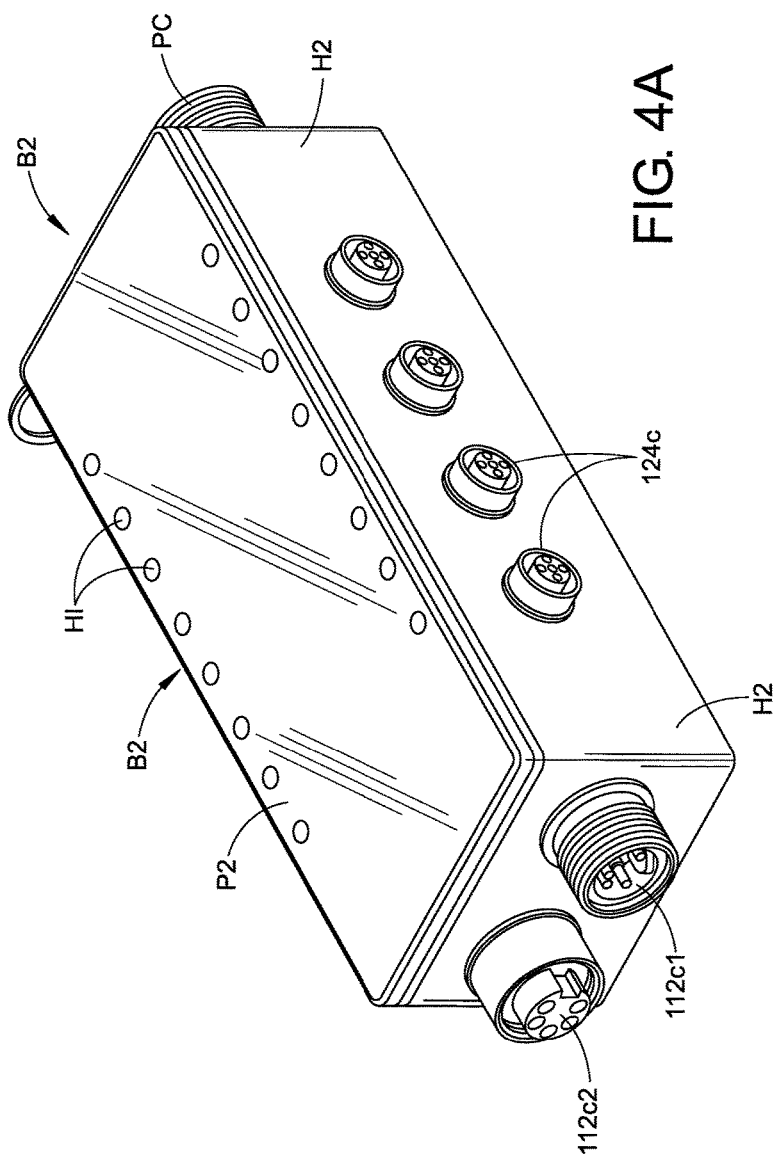
FIG. 4A is an isometric view of an on machine block I/O device with modular connections formed in accordance with a second embodiment of the present development.
Figure 4B:
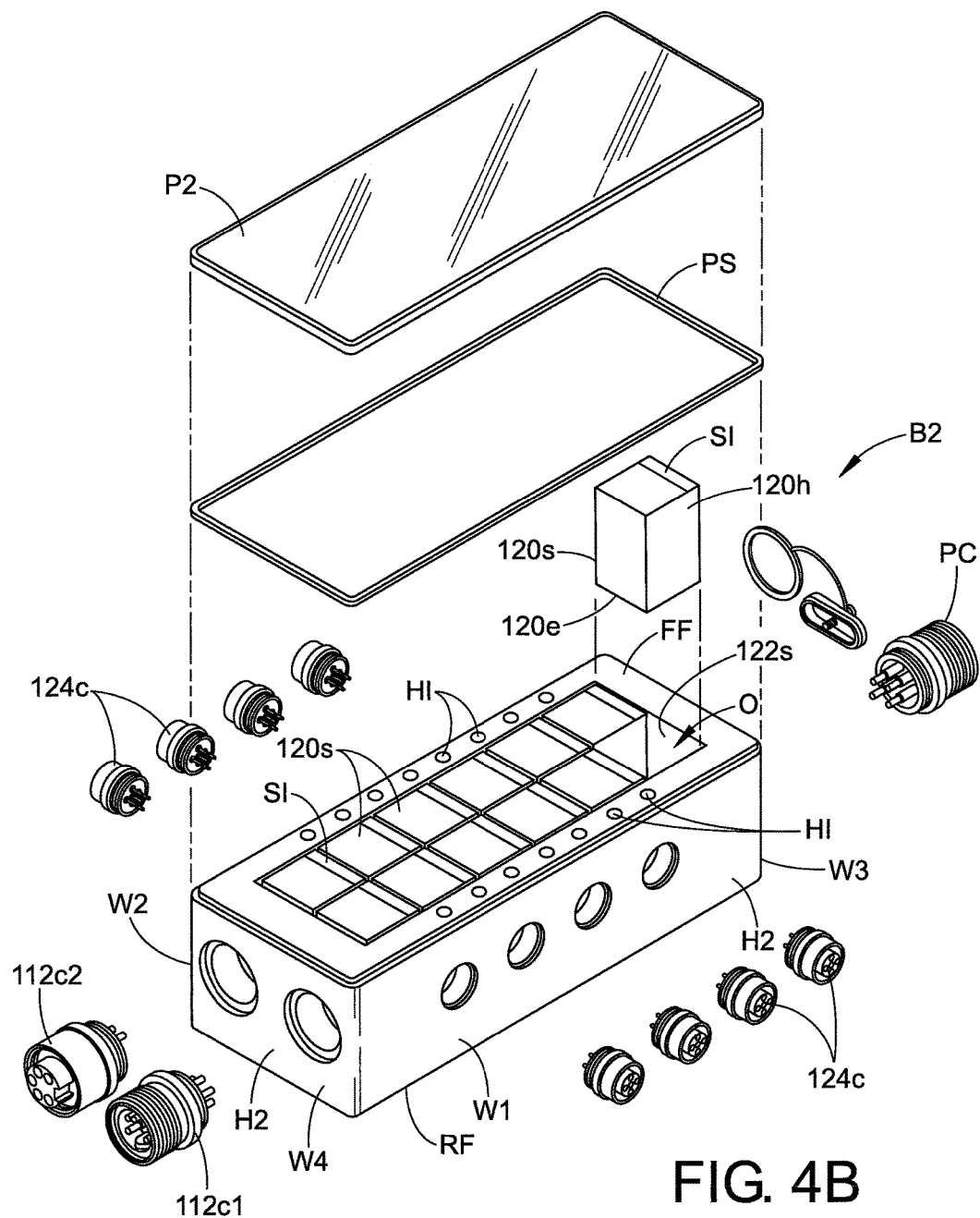
FIG. 4B is an exploded isometric view of the block I/O device of FIG. 4A.

In an alternative embodiment, the one or more removable panels P are connected to and at least partially define the front face FF, rear face RF, and/or the top/bottom walls W3,W4 of the housing H. FIGS. 4A and 4B show an alternative embodiment I/O module B2 that is identical to the module B except as otherwise shown and/or described herein. In particular, the I/O module B2 comprises a housing H2 in which the I/O sockets 122s are located in and open through the front face FF. At least one single removable panel P2 is (or multiple separate removable panels P2 are) selectively connected to the front face FF of the housing H2 to enclose the sockets 122s, and the panel P2 is selectively removed from the housing H2 to expose and open the I/O sockets 122s as shown in FIG. 4B. An elastomeric seal PS is preferably provided between the panel P2 and housing H2 to inhibit ingress of contaminants into the sockets 122s. In the embodiment of FIGS. 4A and 4B, the panel P2 is at least partially transparent to allow for the segment indicia SI present on each I/O segment 120s to be visualized by a user through the panel P2 even when the panel P2 is installed on the housing H in its operative position, without removing the panel, which can facilitate determining the type and operative status of each installed I/O segment 120s.

The embodiment of FIGS. 4A and 4B, in which the panel P2 is connected to and at least partially defines the front face FF of the module B2, provides an added advantage in that the front face FF, which is oriented parallel to the associated machine or other support structure R on which the module B2 is mounted, is uncluttered and unencumbered by the network connectors 112c, power connector PC, and the I/O field connectors 124c. In the illustrated embodiment, the network connectors 112c are connected to and project outwardly from the bottom wall W4, the power connector PC is connected to and projects outwardly from the top wall W3, and the I/O connectors 124c are connected to and project outwardly from at least one (or both as shown) of the sidewalls W1,W2. The first and second sidewalls W1,W2, top wall W3, and bottom wall W4 are arranged perpendicular or otherwise transverse relative to the rear face RF, front face FF, and the associated support surface R on which the module B2 is mounted. The front face FF is arranged parallel to the rear face RF and to the associated support surface R. Preferably, a node address switch SW and any other switches or connectors are also provided on the sidewalls W1,W2, top wall W3, and/or bottom wall W4, which allows the front face FF of the housing 112 to be used for housing indicia HI such as status indicator LEDs, printed information, and/or other indicia I which can simplify monitoring and service of the module B2. Similarly, this unencumbered and unobstructed front face FF provides easy access to the panel P2 and, in cases where the panel P2 is sufficiently transparent, allows any segment indicia SI located on the I/O segment housings 120h to be visualized by an observer through the panel P2 (or by opening the panel P2 if the panel P2 is not sufficiently transparent). Also, because the network, power, and field cables 114, V, 124 do not extend outwardly from the front face FF, the module B2 can be used in locations where space in front of the module B2 is limited, and the wiring pattern is easily visualized for maintenance or module replacement.

Figure 5:
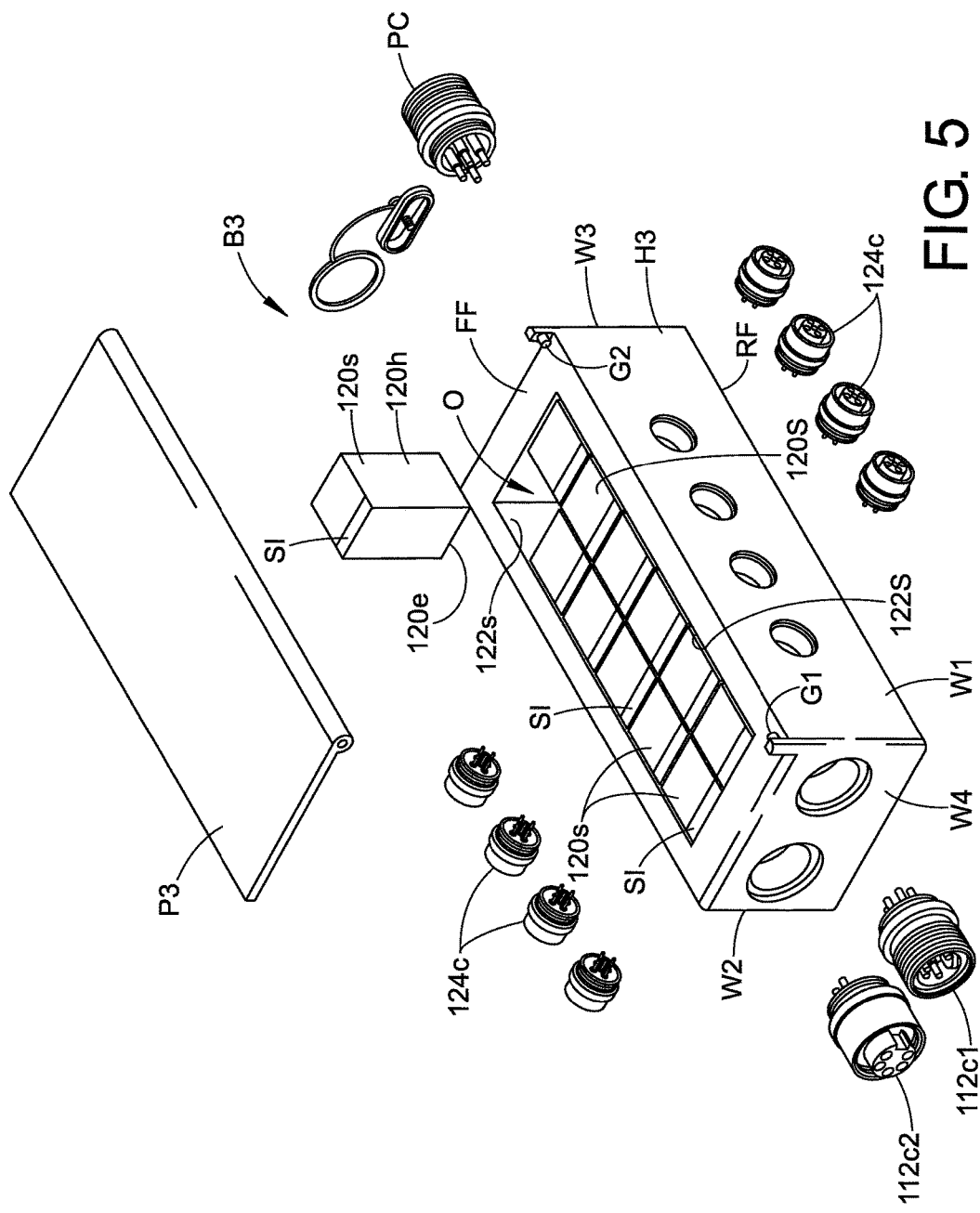
FIG. 5 is an exploded isometric view of an on machine block I/O device with modular connections formed in accordance with a third embodiment of the present development.

FIG. 5 shows a block I/O module B3 that is identical to the module B2 of FIGS. 4A and 4B, except that the panel P2 is replaced by a panel P3 that is movably connected to the housing H3 and that moves between closed and opened (illustrated) positions. In the embodiment of FIG. 5, the housing H3 comprises first and second hinge arms G1,G2 to which the panel P3 is pivotally connected so that the panel P3 is adapted for pivoting movement between a closed position in which it covers the I/O sockets 122s and any installed I/O segments 120s, and the illustrated opened position where the panel P3 is moved to a position where it is spaced from the I/O sockets 122s and installed I/O segments 120s to allow for insertion and removal of the I/O segments 120s.

The panels P,P2,P3 of the respective I/O module embodiments B,B2,B3 are optional and can be omitted, in which case the installed I/O segments 120s are exposed to the exterior of their respective housings H,H2,H3. In such case, the I/O modules B1,B2,B3 can optionally be located in a cabinet or other protective enclosure.

It should be noted that in all of the block I/O module embodiments B, B2, B3 described above, the I/O segments 120*s* can be inserted into and removed from the I/O sockets 122*s* without disconnecting the field cables 124 from the field connectors 124*c*. This simplifies installation, reconfiguration, and/or repair of the module B, B2, B3 and minimizes the opportunity for field cables 124 to be connected or reconnected incorrectly.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. An industrial automation input/output module comprising:
   a module housing;
   a power supply contained in said module housing and adapted to connect with an electrical power source;
   a network adapter contained within said module housing and adapted to connect with an industrial automation data network;
   a plurality of I/O sockets located in said module housing, each of said I/O sockets comprising electrical socket contacts;
   a plurality of I/O segments located in said module housing, each of said I/O segments comprising an I/O segment housing that contains an I/O circuit for processing data from a controlled system and for communicating said data between the controlled system and said network adapter, each of said I/O segments further comprising a plurality of electrical segment contacts operably connected to said I/O circuit;
   each of said I/O segments received and releasably retained in a respective one of said I/O sockets such that the segment contacts of each I/O segment are operably mated with the socket contacts of the I/O socket in which said I/O segment is respectively received and retained for transmission of power and data between said socket contacts and said segment contacts;
   a plurality of field connectors connected to said module housing and each adapted for operably connecting with the controlled system, wherein each of said I/O segments is operably connected to one of said field connectors; and,
   at least one panel that is selectively positioned in one of an opened position and a closed position, wherein said panel covers said plurality of I/O sockets and said plurality of I/O segments when said panel is located in its closed position and said panel is moved away from said plurality of I/O sockets and said plurality of I/O segments when said panel is located in its opened position such that each of said I/O segments is selectively removable from the respective I/O socket in which it is located when said panel is located in its opened position.

2. The industrial automation input/output module as set forth in claim 1, further comprising an elastomeric seal located between said at least one panel an adjacent part of the module housing when said panel is connected to said adjacent part of the module housing, said seal inhibiting the ingress of contaminants into said I/O sockets.

3. The industrial automation input/output module as set forth in claim 1, wherein said at least one panel is transparent to allow each of said I/O segments to be visualized through said at least one panel when said panel is in its closed position.

4. The industrial automation input/output module as set forth in claim 1, wherein said at least one panel comprises first and second panels that are releasably connected to said module housing.

5. The industrial automation input/output module as set forth in claim 1, wherein said at least one panel is pivotally connected to a remainder of said module housing and pivots on an arc between its closed and opened positions.

6. An industrial automation input/output module comprising:
   a module housing;
   a power supply contained in said module housing and adapted to connect with an electrical power source;
   a network adapter contained within said module housing and adapted to connect with an industrial automation data network;
   a plurality of I/O sockets located in said module housing, each of said I/O sockets comprising electrical socket contacts;
   a plurality of I/O segments located in said module housing, each of said I/O segments comprising an I/O segment housing that contains an I/O circuit for processing data from a controlled system and for communicating said data between the controlled system and said network adapter, each of said I/O segments further comprising electrical segment contacts operably connected to said I/O circuit;
   each of said I/O segments received and releasably retained in a respective one of said I/O sockets such that the segment contacts of each I/O segment are operably mated with the socket contacts of the I/O socket in which said I/O segment is respectively received and retained for transmission of power and data between said socket contacts and said segment contacts;
   a plurality of field connectors connected to said module housing and each adapted for operably connecting with the controlled system, wherein each of said I/O segments is operably connected to one of said field connectors;
   wherein at least one of said plurality of I/O segments comprises indicia on said segment housing, wherein said indicia indicates at least one of the type of the I/O circuit contained in said segment housing and the operational state of the I/O circuit contained in said segment housing.

7. The industrial automation input/output module as set forth in claim 6, wherein said indicia comprises at least one of color, text, and an LED indicator light.

8. An industrial automation input/output module comprising:
   a module housing;
   a power supply contained in said module housing and adapted to connect with an electrical power source;
   a network adapter contained within said module housing and adapted to connect with an industrial automation data network;
   a plurality of I/O sockets located in said module housing, each of said I/O sockets comprising electrical socket contacts;

a plurality of I/O segments located in said module housing, each of said I/O segments comprising an I/O segment housing that contains an I/O circuit for processing data from a controlled system and for communicating said data between the controlled system and the network adapter, each of said I/O segments further comprising electrical segment contacts operably connected to said I/O circuit;

each of said I/O segments received and releasably retained in a respective one of said I/O sockets such that the segment contacts of each I/O segment are operably mated with the socket contacts of the I/O socket in which said I/O segment is respectively received and retained for transmission of power and data between said socket contacts and said segment contacts;

a plurality of field connectors connected to said module housing and each adapted for operably connecting with the controlled system, wherein each of said I/O segments is operably connected to one of said field connectors; and, an interface circuit located in said module housing and operatively connected to said power supply, said network adapter, and each of said field connectors, said interface circuit communicating power and data to the socket contacts of each I/O socket and communicating data from the socket contacts of each I/O socket to said network adapter.

9. The industrial automation input/output module as set forth in claim 8, wherein:

said module housing comprises a rear face adapted to be abutted with a support surface on which said module housing is adapted to be mounted, a front face that lies parallel to said rear face, and further comprises first and second sidewalls, a top wall, and a bottom wall that each lie transverse to said front and rear faces;

each of said I/O sockets opens through said front face of said module housing;

each of said field connectors is located on one of said first and second sidewalls of said module housing.

10. The industrial automation input/output module as set forth in claim 8, wherein:

said module housing comprises a rear face adapted to be abutted with a support surface on which said module housing is adapted to be mounted, a front face that lies parallel to said rear face, and further comprises first and second sidewalls, a top wall, and a bottom wall that each lie transverse to said front and rear faces;

each of said I/O sockets opens through one of said first and second sidewalls of said module housing; and, each of said field connectors is located on the front face of said module housing.

11. The industrial automation input/output module as set forth in claim 6, wherein said network adapter is operatively connected to an industrial automation controller through the industrial automation data network.

* * * * *